(12) United States Patent
Vourlat

(10) Patent No.: US 9,751,461 B2
(45) Date of Patent: Sep. 5, 2017

(54) DEVICE FOR DISPLAYING AT LEAST ONE PICTOGRAM INSIDE A VEHICLE PASSENGER COMPARTMENT

(71) Applicant: Faurecia Interieur Industrie, Nanterre (FR)

(72) Inventor: Thierry Vourlat, L'isle-Adam (FR)

(73) Assignee: Faurecia Interieur Industrie, Nanterre (FR)

( * ) Notice: Subject to any disclaimer, the term of this patent is extended or adjusted under 35 U.S.C. 154(b) by 32 days.

(21) Appl. No.: 15/013,815

(22) Filed: Feb. 2, 2016

(65) Prior Publication Data

US 2016/0221498 A1    Aug. 4, 2016

(30) Foreign Application Priority Data

Feb. 3, 2015   (FR) ...................................... 15 50834

(51) Int. Cl.
*B60Q 1/00*        (2006.01)
*B60Q 1/26*        (2006.01)
(Continued)

(52) U.S. Cl.
CPC .............. *B60Q 3/044* (2013.01); *B60K 35/00* (2013.01); *B60K 37/00* (2013.01); *B60K 37/06* (2013.01);
(Continued)

(58) Field of Classification Search
CPC ... B60Q 3/16; B60Q 3/14; B60Q 3/63; B60Q 3/82; B60Q 2500/00; B60Q 3/04;
(Continued)

(56) References Cited

U.S. PATENT DOCUMENTS 5,536,543 A * 7/1996 Papandreou ............ B29C 41/08
                                                          200/314
6,834,987 B2 * 12/2004 Zynda .................... B60Q 3/283
                                                          116/28.1
(Continued)

FOREIGN PATENT DOCUMENTS

DE     102011121758 A1    6/2013
FR          2743534 A1    7/1997
(Continued)

OTHER PUBLICATIONS

French Search Report and Written Opinion corresponding to application No. FR 1550834, dated Dec. 3, 2015, 7 pages, not translated.

*Primary Examiner* — Joseph L Williams
*Assistant Examiner* — Jose M Diaz
(74) *Attorney, Agent, or Firm* — Reising Ethington P.C.

(57) ABSTRACT

A device for displaying at least one pictogram inside a vehicle passenger compartment. The device includes a light source suitable for emitting light in response to a control signal, and an opaque covering layer having a through opening defining the pictogram. A photosensitive layer extends facing or in the opening. When the light source is deactivated, the photosensitive layer is opaque and has the same color as the covering layer. When the light source is activated, the photosensitive layer reacts so as to render the pictogram defined by the opening of the covering layer visible for an occupant of the vehicle passenger compartment.

15 Claims, 1 Drawing Sheet

(51) Int. Cl.
*B60Q 3/04* (2006.01)
*B60K 35/00* (2006.01)
*B60K 37/00* (2006.01)
*B60K 37/06* (2006.01)
*B60Q 3/82* (2017.01)
*B60Q 3/68* (2017.01)
*B60Q 3/14* (2017.01)
*B60Q 3/16* (2017.01)
*B60R 13/02* (2006.01)

(52) U.S. Cl.
CPC .............. *B60Q 3/14* (2017.02); *B60Q 3/16* (2017.02); *B60Q 3/68* (2017.02); *B60Q 3/82* (2017.02); *B60K 2350/2034* (2013.01); *B60K 2350/2039* (2013.01); *B60K 2350/2043* (2013.01); *B60K 2350/2091* (2013.01); *B60Q 2500/00* (2013.01); *B60R 2013/0287* (2013.01)

(58) Field of Classification Search
CPC ........ B60Q 3/042; B60Q 3/044; B60K 37/00; B60K 37/06; B60K 35/00; B60K 2350/2091; B60K 2350/2039; B60K 2350/2043; B60K 2350/203; B60R 2013/0287

See application file for complete search history.

(56) References Cited

U.S. PATENT DOCUMENTS

| | | | |
|---|---|---|---|
| 9,607,488 B2* | 3/2017 | Kim | G08B 5/36 |
| 2015/0091874 A1* | 4/2015 | Drescher | G06F 3/042 |
| | | | 345/175 |
| 2016/0364014 A1* | 12/2016 | Dietz | B60K 37/06 |

FOREIGN PATENT DOCUMENTS

| | | |
|---|---|---|
| FR | 2825832 A1 | 12/2002 |
| FR | 2920120 A1 | 2/2009 |
| FR | 2937929 A1 | 5/2010 |

* cited by examiner

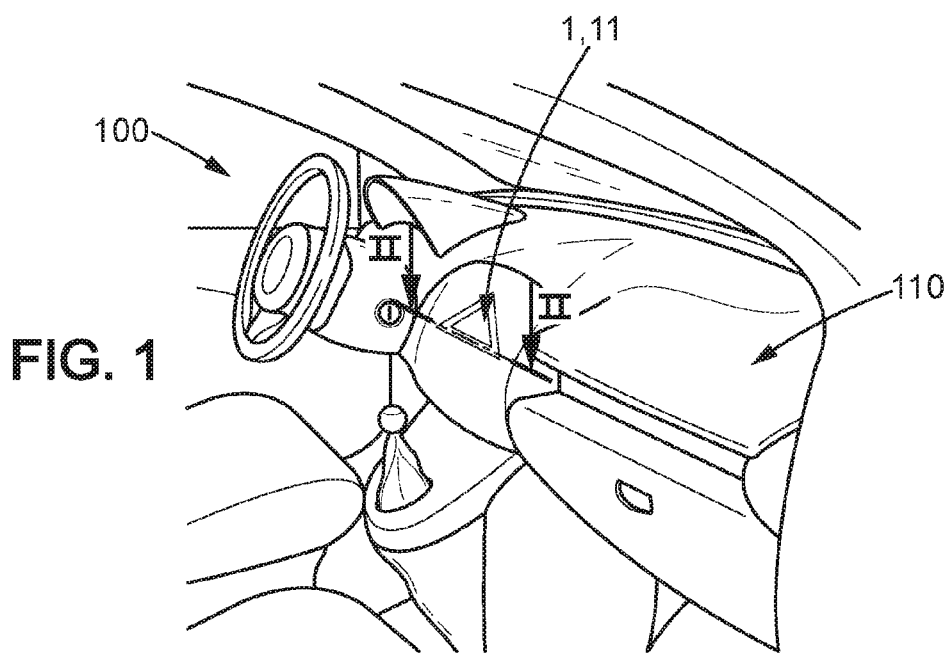
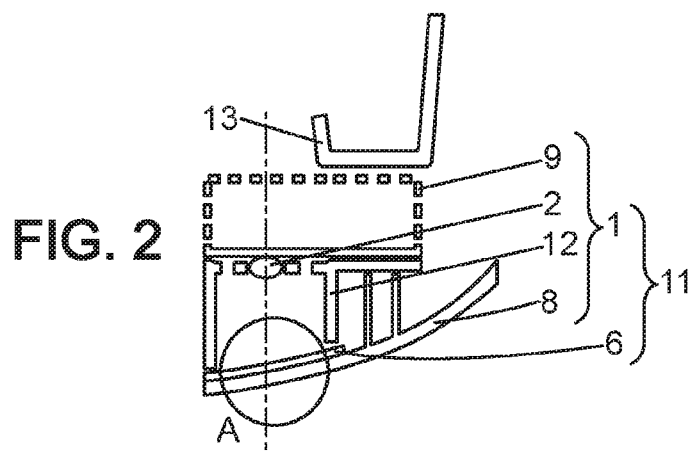
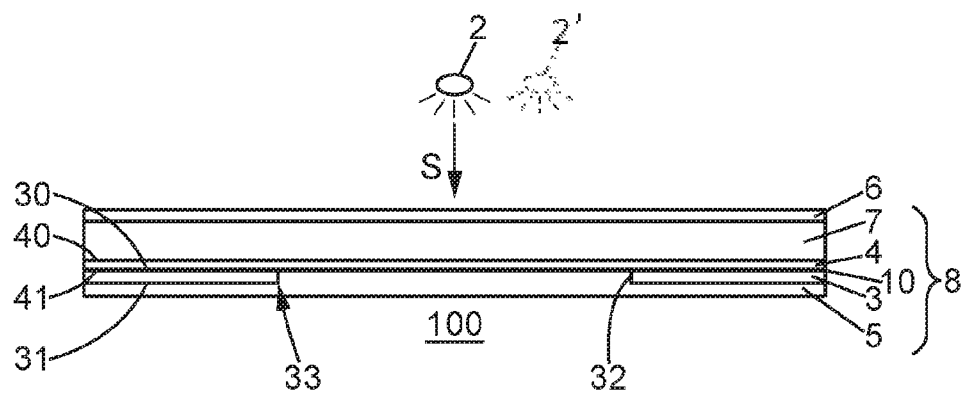

DEVICE FOR DISPLAYING AT LEAST ONE PICTOGRAM INSIDE A VEHICLE PASSENGER COMPARTMENT

TECHNICAL FIELD

The present invention relates to the field of information display devices inside a vehicle passenger compartment, and to the field of vehicle equipment control devices comprising such a display device.

BACKGROUND

More particularly, the invention relates to a device for displaying at least one pictogram inside a vehicle passenger compartment, comprising: a light source connected to a control system and suitable for emitting light in response to a control signal; and an opaque covering layer having a certain color and comprising a through opening defining said pictogram.

The term pictogram denotes herein a symbol, character or set of characters intended to be displayed inside the passenger compartment of a vehicle in order to indicate to an occupant information relating to an item of equipment of the vehicle.

Such a display device may for example be installed on the vehicle instrument panel to indicate to occupants an actuation zone and/or information relating to an operating state of an item of equipment of the vehicle such as an air conditioning system, parking brake system, a de-icing device, etc.

Conventionally, in display devices of this type, the through opening formed in the covering layer and defining the pictogram intended to be displayed to the occupants of the vehicle, is filled or covered with a transparent or translucent element for example mounted by bonding or co-injected with the covering layer. Such a light-permeable element makes it possible to close or cover the opening formed in the covering layer so as to prevent impurities from the vehicle passenger compartment from entering inside the display device, and such that the display device has an outer surface that is visible by the occupants of the vehicle which is smooth, i.e. flush.

Nevertheless, such a conventional pictogram display device notably involves the drawback that, even when the light source is deactivated and is not emitting light towards the covering layer, the pictogram(s) provided thereon are visible for the vehicle occupants, which impairs the general visual appearance of the display device and/or the instrument panel whereon it is arranged.

Indeed, firstly, the light-permeable elements sealing the opening of the covering layer and this opaque covering layer being made of different materials, at least in terms of permeability to light, the pictograms defined by these openings are visible by reflecting the ambient light present inside the passenger compartment for an occupant of the vehicle even when the light source is inactive.

Secondly, the elements sealing or covering the openings of the covering layer are made of a material which is permanently permeable to light, whether the light source is activated or not. For this reason, even when the light source is inactive, the ambient light present inside the vehicle passenger compartment can pass through these elements, be reflected on components situated to the rear and return to the passenger compartment after passing once again through these elements sealing or covering the openings, and thus be visible by the vehicle occupants.

The document FR2825832 describes an example of a display device used in a vehicle equipment touch control device which provides a solution to the problem mentioned above. In the display device according to this document, the light source consists of a light-emitting film, arranged to the rear of a covering layer made of opaque plastic and through which various cut-outs of varied shapes suitable for representing a button, a cursor, etc., have been made.

Such a device offers the advantage that, when the light-emitting film is not active, i.e. when it is not emitting light, the pictograms defined by the cut-outs made in the covering layer are invisible or relatively invisible for an occupant of the vehicle. Indeed, the light-emitting film in the inactive state forms an opaque layer which, having the same color has the covering layer, makes it possible to render the pictograms invisible for an occupant of the vehicle.

However, in order to achieve this aim, the device according to this document FR2825832 uses a light-emitting film as a light source, which involves the major drawback of being a particularly costly solution.

Moreover, the use of such light-emitting films as a light source requires, in particular for questions of limiting costs, grouping/centralising the different pictograms intended to be displayed to the occupants of the vehicle, for example in a circumscribed zone of the instrument panel, which impedes the freedom for the conception and design thereof.

SUMMARY

An aim of the present invention is notably that of remedying the above-described drawbacks of existing display devices.

For this purpose, according to at least one embodiment of the invention, a display device of the type cited above further comprises a photosensitive layer having an inner face facing the light source and an outer face opposite the inner face and facing the vehicle passenger compartment, and extending facing and/or in said opening, and in that, when said light source is deactivated, said photosensitive layer is opaque and has the same color as the covering layer and, when said light source is activated, said photosensitive layer reacts so as to render the pictogram defined by the opening of the covering layer visible for an occupant of the vehicle passenger compartment.

The term "react" denotes herein that the photosensitive layer (reversibly) changes intrinsic optical properties according to whether the light source placed to the rear is active or inactive, i.e. emitting light or not. This change may be conveyed in terms of permeability to light, the photosensitive layer being suitable for allowing the light emitted by the light source to pass at least partially through the opening of the covering layer when this light source is active. In this way, the photosensitive layer has a first optical state, wherein it is substantially opaque, i.e. substantially completely impermeable to light, and in particular to the ambient light present inside the vehicle passenger compartment, and has the same color as the covering layer when the light source is inactive, and a second optical state, wherein it is at least partially permeable to light, and in particular to the light from the light source when said source is active.

The change of intrinsic optical properties of the photosensitive layer following the activation of the light source may also be conveyed in terms of color, the photosensitive layer being suitable for changing color when this light source is active. In this way, the photosensitive layer has a first optical state, wherein it is opaque, i.e. impermeable to light, and in particular to the ambient light present inside the vehicle passenger compartment, and has the same color as the covering layer when the light source is inactive, and a second optical state, in which it remains substantially opaque but has a different color than the covering layer when the light source is active.

By means of these arrangements, the invention in at least some embodiments proposes a display device that is inexpensive to produce, suitable for being installed in various discrete zones of the vehicle, and in particular the instrument panel, and suitable for making the pictograms invisible for the occupants of the vehicle while the light source is not activated.

Advantageously, the light source may consist of a conventional electric bulb or a light-emitting diode (LED) which notably has the advantage of having a low cost price.

In various embodiments of the invention, one and/or another of the following arrangements may optionally be used:

the covering layer is formed from a layer of opaque paint;
the photosensitive layer is formed from a layer of photosensitive paint;
the photosensitive layer reacts above an illumination threshold by the light source, said threshold being greater than the average illumination of a vehicle passenger compartment. As a general rule, particularly in the case of a vehicle with a closed (non-open) passenger compartment travelling during a day of average sunlight, the ambient light present inside a vehicle passenger compartment and received by the various elements situated in this passenger compartment and whereon a display device as disclosed herein can be arranged, such as an instrument panel, a central console, a central rear view mirror, etc., does not exceed on average a certain value hereinafter referred to as average illumination. In this way, setting an illumination threshold above which the photosensitive layer reacts greater than the average illumination of a vehicle passenger compartment prevents the ambient light inside the passenger compartment from making the photosensitive layer react and showing the pictograms defined by the openings formed in the covering layer. In other words, by means of these arrangements, it is ensured that, as a general rule, only the light source can emit a sufficiently intense/strong light to make the photosensitive layer react and change from an opaque state to an at least partially transparent state or make it change color;
the light source is suitable for emitting light situated in a wavelength range to which the photosensitive layer reacts and the display device further comprises a filter situated on the side of the outer face of the photosensitive layer and suitable for blocking at least the wavelength range to which the photosensitive layer reacts of light emitted from the vehicle passenger compartment. The light source is suitable for emitting light situated at least in part in said wavelength range. By means of these arrangements, the portion of the light from the vehicle passenger compartment which has wavelengths to which the photosensitive layer is sensitive/reacts, is blocked by the filter and does not reach the photosensitive layer. This ensures that only the light source, when it is activated, is capable of making the photosensitive layer react;
the covering layer is mounted on the photosensitive layer, acts as a mask of the photosensitive layer outside the zones to be displayed and defines with said photosensitive layer a cavity at the opening, and the display device further comprises a layer of at least partially transparent varnish covering said covering layer and filling said cavity. By means of these arrangements, the outer surface of the display device, visible for the vehicle occupants, appears to be perfectly smooth and uniform, both visually and to the touch, the layer of varnish mounted on the covering layer removing the surface relief present thereon consisting of the opening defining the pictogram to be displayed;
the covering layer is mounted on the photosensitive layer and defines with said photosensitive layer a cavity at the opening, and the display device further comprises a layer of at least partially transparent varnish covering said covering layer, filling said cavity and constituting the filter. In this embodiment, the varnish mounted on the covering layer acts as a filter intended to block the wavelengths of the light from the passenger compartments and to which the photosensitive layer reacts;
the light source is suitable for emitting light comprising light waves situated in a given plane to which the photosensitive layer reacts and the display device further comprises a polarizing film situated on the side of the outer face of the photosensitive layer such that the light from the vehicle passenger compartment and polarized by passing through said film is polarized such that it does not make the photosensitive layer react. In this embodiment, the light from the passenger compartment is converted before it reaches the photosensitive layer, by passing through the polarizing film, such that this converted light cannot make the photosensitive layer react. In this way, in this embodiment, it could be envisaged that the photosensitive layer is only sensitive/reacts to light waves situated in a given plane; in this case, the polarizing film will be designed so as to polarize the light waves from the vehicle passenger compartment in a different plane to the plane cited above. In this way, the photosensitive layer is prevented from being reached by light waves to which it reacts from the vehicle passenger compartment;
the photosensitive layer has negative photochromism properties and the light source is suitable for emitting UV radiation when activated in order to activate the negative photochromism. In this way, when the light source emits UV radiation, the light transmission rate through the photosensitive layer is increased, the photosensitive layer becomes permeable to the light emitted by the light source;
the light source is a first light source and the display device further comprises a second light source connected to the control system and suitable for emitting light in response to a second control signal following the activation of the first light source, the inner face of the photosensitive layer facing the first and second light source;

The various technical solutions envisaged to ensure that only the light source placed to the rear is capable of making the photosensitive layer react and changing it from an opaque state to an at least partially transparent state or making it change color, i.e. the definition of an illumination threshold above which the photosensitive layer reacts, the negative photochromism properties of the photosensitive layer, the use of a filter or a polarizing film, may be used in a display device as disclosed herein cumulatively or alternatively without departing from the scope of the present invention.

The present invention further relates to a vehicle equipment control device comprising a display device as described above and a pressure detection sensor.

According to one particularly advantageous embodiment, the pressure detection sensor is formed from a capacitive film.

Finally, the invention also relates to a vehicle instrument panel comprising a display device and/or a control device as described above.

BRIEF DESCRIPTION OF THE DRAWINGS

Further features and advantages of the invention will emerge in the course of the following description of one of the embodiments thereof, given by way of non-limiting example, with regard to the attached drawings. In the figures:

FIG. 1 is a partial perspective view representing the front part of a vehicle passenger compartment comprising an instrument panel whereon a control device comprising a display device according to an embodiment of the invention is used;

FIG. 2 represents a sectional view along the line II-II in FIG. 1 intended to illustrate the structure of a control device according to an embodiment of the invention installed on the vehicle instrument panel;

FIG. 3 represents on a magnified scale the zone referenced A in FIG. 2 and intended to illustrate the stacking of the layers used in a control device according to an embodiment of the invention.

DETAILED DESCRIPTION

In the various figures, the same references denote identical or similar elements.

FIG. 1 represents a partial perspective view of a front part of a vehicle passenger compartment 100 comprising an instrument panel 110 whereon a vehicle equipment control device 11 comprising a display device 1 is provided.

In this FIG. 1, and for the purposes of simplifying the description hereinafter, the instrument panel 110 illustrated only comprises a single control device 11 envisaged, when actuated, to control switching the vehicle warning lights on and/or off. In this way, in the example of an embodiment in this FIG. 1, the display device 1 used in this warning light control device, makes it possible when activated to display to the occupants of the vehicle a triangular pictogram defining the zone whereon the occupants of the vehicle need to act to switch the warning lights on or off and illustrated with fine lines in FIG. 1.

However, the display device 1 may be used to display further pictograms representative of the actuation zone and/or the operating status of further vehicle equipment, such as an air conditioning system, a parking brake system, a de-icing device, etc., or be used in a device 11 for controlling such equipment without departing from the scope of the present invention.

FIG. 2 illustrates in a sectional view along the line II-II in FIG. 1, the structure of a control device 11 using the pictogram display device 1.

In this FIG. 2, it can be seen that the control device 11 is herein installed on the instrument panel 110 for vehicle and integrated therewith, and attached at a supporting member 13 part of or rigidly connected to the vehicle structure.

The light control device 11 illustrated in this FIG. 2 comprises a device 1 for displaying the triangular pictogram representative of the actuation zone and the operating status of the warning lights, and a pressure detection sensor 6 suitable for detecting pressing and/or pressure applied by an occupant of the vehicle seeking to activate or deactivate the vehicle warning lights.

In the example of an embodiment illustrated in FIGS. 2 and 3, the pressure detection sensor 6 consists of a capacitive film suitable for detecting the contact of a vehicle occupant's finger on the actuation zone of the outer surface of the instrument panel 110 with which the warning light control device 11 is associated.

It could however be envisaged without departing from the scope of the present invention that the pressure detection sensor is formed by a resistive film, or more conventionally that the vehicle equipment control device 11 is presented in the form of a movable button, the actuation whereof is detected by a button position sensor.

Again with reference to this FIG. 2, the control device 11 comprises a device 1 for displaying the triangular pictogram representative of the actuation zone and the operating status of the warning lights which comprises a light source 2 connected to a control system 9, herein an electronic control card, and suitable for emitting light in response to a control signal from the control system 9.

In the embodiment illustrated in FIGS. 2 and 3, the display device 1 is comprised in a vehicle equipment control device 11 using a pressure detection sensor 6. In this way, in this embodiment, the signal controlling the activation of the light source 2 of the display device 1 is generated by the control system 9 for example following the power-up of the instrument panel, notably when the vehicle is started.

Moreover, following the detection of pressure by an occupant of the vehicle on the control device 11 by the pressure detection device 6, the control system 9 generates a signal triggering the activation or deactivation of the equipment controlled by the equipment control device 11, in this instance the warning lights, and is suitable for generating a control signal for the light source 2 controlling the activation thereof for example in flashing mode to represent the active state of the warning lights or the activation thereof in continuous mode to represent the inactive state of the warning lights, leaving the pictogram visible for the occupants of the vehicle and thus continue to define the actuation zone of the warning lights while the instrument panel is powered.

The light source 2 used in the display device 1 may for example consist of a light-emitting diode, which has among other advantages a low electricity consumption, a compact size and a low cost price.

In the example of an embodiment illustrated in FIG. 2, this light source 2 is associated with the light box 12 for guiding the light emitted by the source towards the zone to be illuminated.

Moreover, the pictogram display device 1 comprises a stack of layers 8 comprising an opaque covering layer 3 having a certain color and wherein a through opening 32 which defines the pictogram to be displayed is formed.

More specifically, and as seen in FIG. 3, the covering layer 3 has an inner face 30 situated on the side of the light source 2 and an outer face 31 opposite the inner face 30 and situated on the side of the vehicle passenger compartment. The opening 32 defining the pictogram to be displayed and visible with fine lines in FIG. 1 extends from the inner face 30 to the outer face 31 of the covering layer 3.

In the embodiment illustrated in FIGS. 2 and 3, the stack of layers 8 comprises an insert 7, made for example of plastic, notably translucent, and forms a part of the outer surface of the instrument panel 110 visible for the occupants of the vehicle.

In FIG. 3, the stack of layers 8 further comprises a photosensitive layer 4 having an inner face 40 situated on the side of the light source 2 and an outer face 41 opposite the inner face 40 and situated on the side of the vehicle passenger compartment.

This photosensitive layer 4 further extends facing the opening 32 formed in the covering layer 3 as seen in FIG. 3. Alternatively or in combination, it could be envisaged that the photosensitive layer 4 extends also or instead into the opening 32 of the covering layer 3. In this case, it could advantageously be envisaged that the covering layer 3 and the photosensitive layer 4 are manufactured jointly for example by a plastic co-injection technique or by a duplicate molding technique.

In the example of an embodiment illustrated in the figures, the covering layer 3 is formed from a layer of opaque paint conventionally used to cover vehicle elements such as an instrument panel, and the photosensitive layer 4 is formed from a layer of photosensitive paint.

The photosensitive layer 4 is envisaged to be opaque having the same color as the covering layer 3 when the light source 2 is not emitting light. In other words, when the light source is deactivated, the covering layer 3 and the photosensitive layer 4 are both opaque having the same color. In this way, the opening 32 formed in the covering layer 3 and defining the pictogram to be displayed is masked by the photosensitive layer 4 and is not visible, is not distinctive for an occupant of the vehicle.

Moreover, the photosensitive layer 4 is envisaged to reversibly react to the light emitted by the light source 2 when activated so as to allow this light to pass at least partially through the opening 32 of the covering layer 3, or change color in order to be distinguished from the covering layer 3.

In this way, when the light source 2 is activated, the light emitted by the light source 2 and impacting the inner face 40 of the photosensitive layer 4 makes the photosensitive layer 4 react, i.e. this light changes the intrinsic properties of the photosensitive layer 4 such that said layer becomes at least partially transparent or translucent and allows at least a portion of the light from the light source 2 to pass or changes color in order to be distinguished from the covering layer 3.

Hereinafter in the description, the photosensitive layer 4 will be considered to react when the light source 2 is activated by becoming at least partially transparent or translucent and allowing at least a portion of the light from the light source 2 to pass.

At least a portion of the light emitted by the light source 2 when activated then passes through the photosensitive layer 4 and comes out of the outer face 41 thereof, then passes through the opening 32 formed in the covering layer 3 and leads inside the passenger compartment 100. The pictogram defined by the opening 32 then appears to be illuminated to the occupants of the vehicle.

One aim of the present invention is to ensure that the ambient light present inside the vehicle passenger compartment does not make the photosensitive layer 4 react, such that the pictogram defined in the covering layer 3 is only visible for the occupants of the vehicle when the light source 2 is activated and illuminates the photosensitive layer 4.

Various alternative or cumulative solutions are envisaged for this purpose.

In this way, a first solution may be of envisaging that the photosensitive layer 4 only reacts above a certain illumination threshold S, said threshold S being defined so as to be suitable for being reached by the light emitted by the light source 2, but not by the ambient light present inside the passenger compartment. In this way, it is ensured that the photosensitive layer 4 can only react and become at least partially transparent (or change color if applicable) when it is illuminated by the light source 2 following an activation thereof.

As a general rule, i.e. in the case of a closed or non-open vehicle travelling on a day of average sunlight, the illumination to which a vehicle passenger compartment is subjected does not exceed a certain value hereinafter referred to as average illumination. According to this first solution, the constituent material of the photosensitive layer 4, herein paint, will be chosen so that said photosensitive layer 4 only reacts above an illumination threshold s greater than this average illumination value inside the vehicle passenger compartment. Also, it would be possible for example to choose for the photosensitive layer 4 a material which only reacts above an illumination threshold s greater than the average illumination of a vehicle passenger compartment.

In a variant, the photosensitive layer 4 may have photochromism properties and the light source may emit a low intensity of UV, more accurately negative photochromism properties. When light source 2 is switched on the photosensitive layer 4 is submitted to UV radiation, the photosensitive layer 4 becomes transparent and the mainly visible light emitted by the light source 2 pass through the photosensitive layer 4.

A further solution for achieving the aim mentioned above is that of envisaging a filter 5 situated on the side of the outer face 41 of the photosensitive layer 4, facing the opening 32 of the covering layer 3, and suitable for blocking the light to which the photosensitive layer is sensitive and from the vehicle passenger compartment.

More specifically, according to this solution, it is envisaged that the photosensitive layer reacts to light situated in a given wavelength ranging between $\lambda 1$ and $\lambda 2$. The light source 2 is suitable for emitting light situated at least in part in said given wavelength range $\lambda 1$-$\lambda 2$ to which the photosensitive layer 4 reacts, wherein the inner face 40 is impacted by this light, reacts to change from an opaque state to an at least partially transparent state (or change color if applicable). A filter 5 is then envisaged, situated on the side of the outer face 41 of the photosensitive layer 4, i.e. that facing the vehicle passenger compartment, at the opening 32 of the covering layer 3, and suitable for blocking at least the light situated in the wavelength range $\lambda 1$-$\lambda 2$ from the passenger compartment. In this way, the portion of the light from the passenger compartment which has a wavelength situated in the range $\lambda 1$-$\lambda 2$ to which the photosensitive layer 4 is sensitive will be blocked by the filter 5 and will not reach said photosensitive layer 4.

In the embodiment illustrated in FIG. 3, the stack of layers 8 successively comprises in the direction S of light diffusion from the light source 2 from said light source 2 to the passenger compartment 100, the insert 7, the photosensitive layer 4 mounted on the insert 7, a film 10 the purpose whereof will be described hereinafter and mounted on the photosensitive layer 4, the opaque covering layer 3 mounted on the film 10 and comprising the opening 32 forming the pictogram to be displayed, and a layer of varnish 5 mounted on the covering layer 3 and also filling the cavity 33 defined at the opening 32 by the covering layer 3 and the photosensitive layer 4.

This varnish advantageously makes it possible to mask the surface relief present on the visible face of the display device 1 by filling the cavity 33 defined by the opening 32 formed in the covering layer 3, thus offering to the view of an occupant of the vehicle a smooth and uniform visible surface.

The varnish forming this layer of varnish 5 may further be advantageously chosen so as to fulfil the function of the filter mentioned above.

A third solution envisaged to achieve the aim mentioned above is that of envisaging on the side of the outer face 41 of the photosensitive layer 4, i.e. that subjected to the ambient light from the vehicle passenger compartment 100, facing the opening 32 of the covering layer 3, a polarizing film 10 for polarizing the light from the passenger compartment 100 such that this polarized light cannot make the photosensitive layer 4 react.

More specifically, it can be envisaged that the photosensitive layer 4 only reacts when subjected to light waves situated in a given plane P. The light source 2 will be suitable for emitting at least light waves situated in this given plane P such that the light emitted by the light source 2 is capable of making the photosensitive layer 4 react. The polarizing film 10 will then be chosen so that it polarizes the light from the vehicle passenger compartment, and passing through the opening 32 of the covering layer 3, such that the light waves passing through said film 10 and impacting the outer face 41 of the photosensitive layer 4 is polarized in a different plane P' to the plane P. In this way, the light from the passenger compartment and passing through the polarizing film 10 before reaching the photosensitive layer 4 cannot make said layer react, as the constituent waves thereof will have been polarized in a different plane P' to the plane P.

The different layers forming the stack of layers 8 visible in FIG. 3 may be mounted on one another for example by bonding or by any other suitable method known to those skilled in the art.

In the example of an embodiment described herein, the photosensitive layer 4 and the covering layer 3 are embodied in the form of paints applied on the insert 7 ensuring the structural rigidity of the section of instrument panel 110 whereon the display device 1 is arranged. Alternatively, it could be envisaged to do without the insert 7, by designing at least one among the covering layer 3 and the photosensitive layer 4 in the form of a structural element made for example of plastic and having a specific structural rigidity.

In a further alternative or cumulative embodiment with respect to the above, the light source 2 is a first light source and the display device 1 further comprises a second light source 2' (shown with dotted lines in FIG. 3) connected to the control system 9 and suitable for emitting light in response to a second control signal following the activation of the first light source 2, the inner face 40 of the photosensitive layer 4 facing the first and the second light source 2, 2'.

In this way, in this embodiment, it can be envisaged that the first light source 2 is envisaged to make the photosensitive layer react for example by emitting UV light, by inducing the at least partial transparency thereof or the change of color thereof, and that the second light source 2' is envisaged to illuminate the inner face 40 of the photosensitive layer, i.e. to emit visible light so as to accentuate the visibility of the pictogram defined by the opening 32 formed in the covering layer for the occupants of the vehicle passenger compartment.

The second control signal inducing the activation of the second light source 2' may be generated by the control system 9 either automatically, simultaneously or directly after the generation of the first control signal controlling the activation of the first light source 2, or following a specific command initiated by an occupant of the vehicle passenger compartment.

In particular, in the case of the use of the display device 1 in a vehicle warning light control device 11, it may for example be envisaged with this embodiment, that the first light source 2 is activated in continuous mode by the control system 9 from the power-up of the instrument panel, notably following contact (in other words, starting) of the vehicle, this activation inducing the reaction of the photosensitive layer, which may be conveyed by a change of degree of transparency or color thus rendering the pictogram visible for the occupants of the vehicle, and that the second light source 2' is activated in flashing mode following a warning light actuation command initiated by an occupant of the vehicle passenger compartment by actuating the control device 11, and thus represent the active operating status of the warning lights.

Of course, the subject matter of the invention is not restricted to the embodiments described as illustrative and not limitative embodiments. For instance, even if it is not preferred according to the invention, the photosensitive layer 4 may extend on the outer face 31 of the covering layer 3.

The invention claimed is:

1. Device for displaying at least one pictogram inside a vehicle passenger compartment, comprising:
    a light source connected to a control system and suitable for emitting light in response to a control signal;
    an opaque covering layer having a certain color and comprising a through opening defining said pictogram; and
    a photosensitive layer having an inner face facing the light source and an outer face opposite the inner face and facing the vehicle passenger compartment, and extending facing and/or in said opening;
    wherein, when said light source is deactivated, said photosensitive layer is opaque and has the same color as the covering layer and, when said light source is activated, said photosensitive layer reacts so as to render the pictogram defined by the opening of the covering layer visible for an occupant of the vehicle passenger compartment.

2. Display device according to claim 1, wherein the covering layer is formed from a layer of opaque paint.

3. Display device according to claim 1, wherein the photosensitive layer is formed from a layer of photosensitive paint.

4. Display device according to claim 1, wherein the photosensitive layer reacts above an illumination threshold by the light source, said threshold being greater than the average illumination of a vehicle passenger compartment.

5. Display device according to claim 1, wherein the light source is suitable for emitting light situated in a wavelength range to which the photosensitive layer reacts and further comprising a filter situated on the side of the outer face of the photosensitive layer and suitable for blocking at least the wavelength range to which the photosensitive layer reacts of light emitted from the vehicle passenger compartment.

6. Display device according to claim 1, wherein the covering layer is mounted on the photosensitive layer and defines with said photosensitive layer a cavity at the opening, and further comprising a layer of transparent varnish covering said covering layer and filling said cavity.

7. Display device according to claim 1, wherein the covering layer is mounted on the photosensitive layer and defines with said photosensitive layer a cavity at the opening, and further comprising a layer of transparent varnish transparent covering said covering layer, filling said cavity and constituting the filter.

8. Display device according to claim 1, wherein the light source is suitable for emitting light comprising light waves situated in a given plane to which the photosensitive layer reacts, and further comprising a polarizing film situated on the side of the outer face of the photosensitive layer such that the light from the vehicle passenger compartment and polarized by passing through said film is polarized such that it does not make the photosensitive layer react.

9. Display device according to claim 1, wherein the photosensitive layer has negative photochromism properties and the light source is suitable for emitting UV radiation when activated in order to activate the negative photochromism.

10. Display device according to claim 1, wherein the light source is a first light source and further comprising a second light source connected to the control system and suitable for emitting light in response to a second control signal following the activation of the first light source, the inner face of the photosensitive layer facing the first and second light source.

11. Vehicle equipment control device having a pressure detection sensor and a display device comprising:
 a light source connected to a control system and suitable for emitting light in response to a control signal, and;
 an opaque covering layer having a certain color and comprising a through opening defining said pictogram,
 wherein the display device further comprises a photosensitive layer having an inner face facing the light source and an outer face opposite the inner face and facing the vehicle passenger compartment, and extending facing and/or in said opening, and when said light source is deactivated, said photosensitive layer is opaque and has the same color as the covering layer and, when said light source is activated, said photosensitive layer reacts so as to render the pictogram defined by the opening of the covering layer visible for an occupant of the vehicle passenger compartment.

12. Vehicle equipment control device according to claim 11, wherein the pressure detection sensor is formed from a capacitive film.

13. Vehicle instrument panel having a display device comprising:
 a light source connected to a control system and suitable for emitting light in response to a control signal, and;
 an opaque covering layer having a certain color and comprising a through opening defining said pictogram,
 wherein the display device further comprises a photosensitive layer having an inner face facing the light source and an outer face opposite the inner face and facing the vehicle passenger compartment, and extending facing and/or in said opening, and when said light source is deactivated, said photosensitive layer is opaque and has the same color as the covering layer and, when said light source is activated, said photosensitive layer reacts so as to render the pictogram defined by the opening of the covering layer visible for an occupant of the vehicle passenger compartment.

14. Vehicle instrument panel according to claim 13 further comprising a pressure detection sensor.

15. Vehicle instrument panel according to claim 14 wherein the pressure detection sensor is formed from a capacitive film.

\* \* \* \* \*